(12) United States Patent
Nordlander

(10) Patent No.: US 9,147,351 B2
(45) Date of Patent: Sep. 29, 2015

(54) SIMULATION DEVICE FOR TRAINING EQUIPMENT FOR A VEHICLE

(75) Inventor: Per-Åke Nordlander, Bjästa (SE)

(73) Assignee: BAE Systems Hägglunds Aktiebolag, Örnsköldsvik (SE)

(*) Notice: Subject to any disclaimer, the term of this patent is extended or adjusted under 35 U.S.C. 154(b) by 0 days.

(21) Appl. No.: 13/635,670

(22) PCT Filed: Mar. 18, 2011

(86) PCT No.: PCT/SE2011/050295
§ 371 (c)(1),
(2), (4) Date: Nov. 14, 2012

(87) PCT Pub. No.: WO2011/115566
PCT Pub. Date: Sep. 22, 2011

(65) Prior Publication Data
US 2013/0059274 A1    Mar. 7, 2013

(30) Foreign Application Priority Data
Mar. 18, 2010 (SE) ...................................... 1050250

(51) Int. Cl.
*G09B 9/04* (2006.01)
*G09B 9/00* (2006.01)
*G09B 9/05* (2006.01)

(52) U.S. Cl.
CPC *G09B 9/003* (2013.01); *G09B 9/04* (2013.01); *G09B 9/05* (2013.01)

(58) Field of Classification Search
CPC ........ G09B 23/16; G09B 23/18; G09B 23/26; G09B 9/54; G05B 17/00

USPC ...................................................... 434/11–71
See application file for complete search history.

(56) References Cited

U.S. PATENT DOCUMENTS

| 4,750,888 A | 6/1988 | Allard et al. |
| 5,277,584 A | 1/1994 | DeGroat et al. |

(Continued)

FOREIGN PATENT DOCUMENTS

| CA | 2266915 A1 | 10/1999 |
| DE | 19928490 A1 | 12/2000 |

(Continued)

OTHER PUBLICATIONS

International Search Report and Written Opinion received for PCT Patent Application No. PCT/SE2011/050295, mailed on Jul. 11, 2011, 12 pages.

(Continued)

*Primary Examiner* — Timothy A Musselman
(74) *Attorney, Agent, or Firm* — Morrison & Foerster LLP

(57) ABSTRACT

The invention relates to a simulation device (110) concerning a ground vehicle comprising a vehicle model (115) comprising a predetermined number of function models (130b; 131b; 132b) for simulation of corresponding physical function elements (130a; 131a; 132a) of said vehicle. Said function models (130a; 131b; 132b) are based on vehicle characteristics determined in connection to development and manufacturing of said vehicle and hereby on real characteristics of the physical vehicle. The invention also relates to a computer program and a computer program product comprising a program code (P) for a computer (110; 300).

9 Claims, 2 Drawing Sheets

(56) References Cited

U.S. PATENT DOCUMENTS

| | | | |
|---|---|---|---|
| 5,431,569 | A | 7/1995 | Simpkins et al. |
| 5,898,861 | A * | 4/1999 | Emerson et al. ............... 703/23 |
| 6,106,298 | A * | 8/2000 | Pollak .......................... 434/29 |
| 2006/0030429 | A1 | 2/2006 | Rankin |
| 2009/0187687 | A1 | 7/2009 | Hulbert et al. |
| 2013/0059275 | A1 | 3/2013 | Nordlander |

FOREIGN PATENT DOCUMENTS

| | | |
|---|---|---|
| DE | 10114433 A1 | 10/2002 |
| DE | 10309934 A1 | 9/2004 |
| EP | 0947797 A2 | 10/1999 |
| EP | 1715285 A1 | 10/2006 |
| EP | 1895488 A2 | 3/2008 |
| WO | 2007/109625 A2 | 9/2007 |

OTHER PUBLICATIONS

Kallmann et al., "Immersive Vehicle Simulators for Prototyping, Training and Ergonomics", Proceedings of the Computer Graphics International (CGI'03), 2003, 6 pages.

International Search Report and Written Opinion received for PCT Patent Application No. PCT/SE2011/050296, mailed on Jul. 11, 2011, 10 pages.

International Preliminary Report on Patentability received for PCT Patent Application No. PCT/SE2011/050296, mailed on Sep. 27, 2012, 7 pages.

International Preliminary Report on Patentability received for PCT Patent application No. PCT/SE2011/050295, mailed on Sep. 27, 2012, 8 pages.

Non-Final Office Action received for U.S. Appl. No. 13/635,672, mailed on Oct. 25, 2013, 6 pages.

Final Office Action received for U.S. Appl. No. 13/635,672, mailed on Feb. 25, 2014, 7 pages.

Nordlander, P., U.S. Office Action mailed Oct. 2, 2014, directed to U.S. Appl. No. 13/635,672; 6 pages.

Non Final Office Action received for U.S. Appl. No. 13/6935,672, mailed on May 1, 2014, 7 pages.

Final Office Action received for U.S. Appl. No. 13/635,672, mailed on Feb. 27, 20145, 8 pages.

Extended European Search Report received for European Patent Application No. 11756637.2, mailed on Jun. 10, 2015, 10 pages.

Extended European Search Report received for European Patent Application No. 11756638.0, mailed on Jun. 10, 2015, 8 pages.

Verhoeff et al., "Vehil: A Full-Scale Test Methodology for Intelligent Transport Systems, Vehicles and Subsystems", Intelligent Vehicles Symposium, Proceedings of the IEEE Dearborn, Oct. 3-5, 2000, pp. 369-375.

Hanselmann, H., "Real-Time Simulation Replaces Test Drives", Test and Measurement World, vol. 16, No. 3, Feb. 15, 1996, pp. 35-40.

Gietelink et al., "Development of Advanced Driver Assistance Systems with Vehicle Hardware-in-the-Loop Simulations", Vehicle System Dynamics, vol. 44, No. 7, Jul. 2006, pp. 569-590.

Verburg et al., "Vehil: Developing and Testing Intelligent Vehicles", Intelligent Vehicle Symposium, vol. 2, Jun. 17, 2002, pp. 537-544.

* cited by examiner

SIMULATION DEVICE FOR TRAINING EQUIPMENT FOR A VEHICLE

CROSS REFERENCE TO RELATED APPLICATIONS

This is a U.S. National Phase patent application of PCT/SE2011/050295, filed Mar. 18, 2011, which claims priority to the Swedish Patent Application No. 1050250-8, filed Mar. 18, 2010, each of which is hereby incorporated by reference in the present disclosure in its entirety.

TECHNICAL FIELD

The present invention relates to a simulation device for training equipment for a ground vehicle. The invention also relates to a computer program and a computer program product comprising a program code for a simulation device for training equipment for a ground vehicle.

BACKGROUND

In the field of simulation equipment for training for training equipment a number of different ways of providing training equipment exist today for e.g. operators of military vehicles. By providing training equipment personnel of different kinds may practice in driving and handling vehicles being relatively expensive to practice on in reality. Vehicles suitable for such simulation equipments may comprise military vehicles, such as e.g. tanks or combat vehicles.

Today virtual vehicles are used as models for real vehicles. These virtual vehicles are basically general vehicle models comprising different subsystems, such as e.g. an arbitrary number of wheels, engine, gear box, etc. These vehicle models are among others used in the game industry for facilitating fairly realistic game experiences for users of games where vehicles are included. The virtual vehicles are however associated with certain deficiencies, which in turn depend on to high costs for providing more accurate models. Virtual vehicles of this kind fill its function so far as providing satisfactory performance regarding the experienced vehicle dynamics for a player.

Another kind of virtual vehicles are based on data registered in real vehicles during drive. In these models also a general model in which certain parameters may be changed for providing a desired performance of the virtual vehicle.

By performing a so called "reversed engineering" of an existing vehicle to be simulated the existing vehicle may be post created as a virtual vehicle. Theses virtual vehicles are of fairly high quality. A disadvantage with this method is however that it takes very long time to model the existing vehicle as a vehicle model, which of course is costly and complex. In certain cases it is even so that it may take as long time to create a virtual vehicle as a model of a real vehicle as it would have taken to develop the real vehicle.

Companies developing virtual vehicles today to model real vehicles provide updating packages and all kinds of services associated with maintenance and education. For a purchaser of vehicles, such as e.g. military vehicles, this may be costly and inefficient since vehicles continuously develop to improve performance thereof. Not least delays in education by means of training equipment of purchasers of vehicles since in practice it takes relatively long time to perform a "reversed engineering" of the updated real vehicles for providing a corresponding updated virtual vehicle.

Different purchasers of vehicles have different needs of training equipment for their vehicles. Generally it can be said that a simulation environment which is realistic may result in a better concept of reality and thereby better training results. However, a training equipment having so many physical function elements may be costly, wherefore the most relevant function elements, such as e.g. gas trigger and steering member, are used to be used at a user terminal where training personnel are present.

Since different simulated exercises have different purposes needs of different specific physical function elements use to vary. The physical function elements being suitable for certain simulated exercises may be unnecessary for other types of simulation exercises.

A disadvantage with the training systems existing today is that they comprise statistical vehicle models being time consuming and costly to update. Further it is difficult or impossible today to integrate different types of physical function elements in training equipments in a user friendly way.

There is thus a need to provide a simulation device for training equipment providing a higher degree of flexibility and versatility for a user, such as a purchaser of a vehicle.

SUMMARY OF THE INVENTION

An object of the present invention is to provide a new and advantageous simulation device for training equipment.

Another object of the invention is to provide a more versatile simulation device for training equipment.

An additional object of the invention is to provide a new and advantageous computer program for a simulation device for training equipment.

Another object of the invention is to provide a more versatile computer program for a simulation device for training equipment.

Another object of the invention is to provide a vehicle model facilitating improved simulations by means of training equipment for vehicles.

Yet another object of the present invention is to provide a computer program and a computer program product facilitating improved simulations by means of training equipment for vehicles.

These objects are achieved with a simulation device for training equipment according to claim 1.

According to an aspect of the invention a simulation device for training equipment for a real ground vehicle is provided comprising a vehicle model including a predetermined number of function models for simulation of corresponding physical function elements of said vehicle. The simulation device comprises arrangements for storing of a vehicle model developed at the development and manufacturing of the vehicle, the vehicle characteristics of the function models of the vehicle model being based on real characteristics of the function element of the physical vehicle.

According to an aspect of the invention a simulation device for training equipment for a real ground vehicle is provided, comprising a vehicle model including a predetermined number of function models for simulation of corresponding physical function elements of said vehicle, said function models being based on vehicle characteristics in connection to development and manufacturing of said vehicle and hereby on real characteristics of the physical vehicle.

Through continuous use of the real vehicle characteristics at development of the vehicle a vehicle model may be ready for simulation use when the vehicle is ready. By providing arrangements for storage of the vehicle model in the simulation device this may be continuously updated and refined in desired extent such that an even more reliable training equipment may be provided.

It is possible to sense and signal that a determined function element is engaged to the simulation device according to the invention. This may according to an example occur through called strappings in the connector, by means of which function elements are engaged. An electric circuit is closed, which may be sensed and signalled in order to effectuate deactivation. This may according to another example occur through continuous contact with and sensing by means of a data bus of a network for signalling an engagement of a function element with subsequent deactivation. Disengagement of a determined function element is performed in a corresponding way providing reactivation.

The simulation device may further comprise an interface between said since the vehicle model according to the invention is based on function models being developed during development of the real vehicle an improved vehicle model may be provided. This function model comprises function models of corresponding function elements of the real vehicle, which function models are the most thorough existing and being available.

Use of corresponding function models having been developed through so called "reversed engineering" generally give worse simulation performance than for the function models having been developed during development of the real vehicle.

Further the invention has the advantage that only a very precise vehicle model may be provided at a much earlier stage than if a corresponding vehicle model would have been developed afterwards.

According to an aspect of the invention a simulation device concerning a ground vehicle is provided comprising a vehicle model including a predetermined number of vehicle models for simulation of corresponding physical function elements of said vehicle. Said function models are based on vehicle characteristics in connection to development and manufacturing of said vehicle and hereby on real characteristics of the physical vehicle.

Said vehicle characteristics may reproduce real sets of values of said characteristics including parameters.

Said vehicle characteristics may be accessability in terrain, which may be based on parameters such as e.g. ground properties, shape of the chassis of the vehicle, type of tires or tracks of the vehicle, centre of gravity position of the vehicle, weight of the vehicle, type of wheel suspension of the vehicle, type of band stand of the vehicle, spring properties of the vehicle, type of damper of the vehicle, function for semi-active damping of the vehicle, etc.

Said vehicle characteristics may be associated with a direction system for a tower of the vehicle, which may be based on parameters such as e.g. type of direction handle, servo design, choice of direction motors, weight of the tower, centre of gravity position of the tower etc.

Said function element may comprise any function element being chosen from a group comprising engine, gearbox, control system and weapons system.

According to an aspect of the invention a computer program for a simulation device for training equipment for a real ground vehicle is provided, the simulation model comprising a vehicle model including a predetermined number of function models for simulation of corresponding physical function elements of said vehicle and arrangements for engaging physical function elements to the simulation device, said computer program comprising program code stored on a, by a computer readable, medium for causing, when it is run on a computer, the simulation device to perform the steps of:

deactivating a function model concerning a determined function element at engagement of corresponding physical function element to the simulation device, and to reactivate the deactivated function model at disengagement of said engaged function element, said function models being based on vehicle characteristics determined in connection to development and manufacturing of said vehicle and hereby on real characteristics of the physical vehicle.

According to an aspect of the invention a computer program for a simulation device for training equipment for a real ground vehicle is provided, the simulation model comprising a function model including a predetermined number of function models for simulation of corresponding physical function elements of said vehicle and devices for engaging physical function elements to the simulation device, said computer program comprising program code stored on a, by a computer readable, medium for causing, when run on a computer, the simulation device to perform the steps of:

deactivating a function model concerning a determined function element at engagement of corresponding physical function element to the simulation device, and to reactivate the deactivated function model at disengagement of said engaged function element, said function models being based on vehicle characteristics determined in connection to development and manufacturing of said vehicle and hereby on real characteristics of the physical vehicle.

For said computer program said vehicle characteristics may represent real sets of values of parameters comprised in said characteristics.

For said computer program said function elements comprises any function element being chosen from a group comprising engine, gear box, control system and weapons system.

According to an aspect of the invention a computer program product is provided comprising a program code stored on a, by a computer readable, medium for performing, when run on a computer of a simulation device for training for a real ground vehicle, said simulation model comprising a vehicle model including a predetermined number of function models for simulation of corresponding physical function elements of said vehicle and arrangements for engaging physical function elements to the simulation device, the method steps of deactivating a function model concerning a determined function element at engagement of corresponding physical function element to the simulation device, and to reactivate the deactivated function model at disengagement of said engaged function element, when said computer program is run on the simulation unit, said function models being based on vehicle characteristics determined in connection to development and manufacturing of said vehicle and hereby on real characteristics of the physical vehicle.

According to an aspect of the invention a computer program product comprising a program code stored on a, by a computer readable, medium for performing, in a simulation device for training equipment for a real ground vehicle, said simulation model comprising a vehicle model comprising a predetermined number of function models for simulation of corresponding physical function elements of said vehicle and arrangements for engaging physical function elements to the simulation, the method steps of:

deactivating a function model concerning a determined function element at engagement of corresponding physical function elements to the simulation device, and to reactivate the deactivated function model at disengagement of said engaged function element, when said computer program is run on the simulation device, said function models being based on vehicle characteristics determined in connection to development and manufacturing of said vehicle and hereby on real characteristics of the physical vehicle.

For said computer program said vehicle characteristics may represent real sets of values of parameters comprised in said characteristics.

For said computer program said function elements may comprise any function element being chosen from a group comprising engine, gear box, control system and weapons system.

According to an aspect of the invention a simulation device for training equipment for a real ground vehicle is provided, comprising
 a vehicle model comprising a predetermined number of function models for simulation of corresponding physical function elements of said vehicle and arrangements for engaging physical function elements to the simulation device. The simulation device is arranged such that a function model concerning a determined function element is intended to be deactivated at engagement of corresponding physical function elements and such that the deactivated function model is reactivated at disengagement of said engaged function element.

The simulation device may further comprise an interface between said engaged physical function element and the simulation device. The interface between said engaged physical function element and the simulation device may be a serial CAN-interface. By providing a serial CAN-interface for training equipment a well defined framework for facilitating a flexible and dynamic platform for training equipment is provided where different distributors of function elements may cooperate in a cost efficient way. The interface between said engaged physical function element and the simulation device may be a serial, analogue or digital interface. Examples on interfaces between said engaged physical function elements and the simulation device may be Ethernet, RS232, RS422 or RS485.

The number of engageable physical function elements may be arbitrary. In this way a versatile training equipment for vehicles is provided where a user may chose practically any function elements having a correspondence in the real vehicle to be simulated by means of a vehicle model in the simulation device according to an aspect of the invention.

Said physical function element may be chosen from the group comprising measuring in equipment, steering member, such as e.g. a wheel or a joystick, periscope, gear shifting member, instrument panel and tower of a military vehicle.

The simulation device may be engageable to a user terminal for personnel to be trained by means of the simulation device. The function elements being engaged are preferably present at the user terminal for practical use thereof.

The simulation device may be engageable to an instructor unit. The instructor unit facilitates initiation, command, monitoring and evaluation of different simulated scenarios comprising at least a virtual ground vehicle.

The simulation device may be engageable to a second simulation unit comprising an environment model. The environment model provides a virtual environment, in which different simulated scenarios comprising at least a virtual ground vehicle take place.

The simulation device may be engageable to a second simulation unit comprising an actor model. The actor model provides and administrates an arbitrary number of units, such as fictitious hostile vehicles or troops, civil vehicles or civil persons for different simulation scenarios where the at least one ground vehicle participates.

The simulation device may further comprise an interface between said second simulation unit and the simulation device. The interface may be HLA. By providing HLA-standard for training equipment for training equipment a well defined framework for facilitating a flexible and dynamic platform for training equipment in a cost efficient way is provided.

The second simulation unit may comprise an interface between said second simulation unit and the instructor unit. The interface may be HLA. By providing HLA-standard for training equipment a well defined framework for facilitating a flexible and dynamic platform for training equipment in a cost efficient way is provided.

According to an aspect of the invention a computer program for a simulation device for training equipment for a ground vehicle is provided, the simulation device comprising a vehicle model including a predetermined number of function models for simulation of corresponding physical function elements of said vehicles and arrangements for engaging physical function elements to the simulation device, said computer program comprising program code stored on a, by a computer readable, medium for causing the simulation device to perform the steps of:
 deactivating a function model concerning a determined function element at engagement of corresponding physical function element to the simulation device, and to
 reactivate the deactivated function model at disengagement of said engaged function element.

According to an aspect of the invention a computer program product comprising a program code stored on a, by a computer readable, medium for performing, when run on a computer of a simulation device for training for a real ground vehicle, said simulation model comprising a vehicle model comprising a predetermined number of function models for simulation of corresponding physical function elements of said vehicle and arrangements for engaging physical function elements to the simulation device, the method steps of
 deactivating a function model concerning a determined function element during engagement of corresponding physical function element to the simulation device, and to
 reactivate the deactivated function model during disengagement of said engaged function element, when said computer program is run on the simulation unit.

Software for a simulation device for training equipment according to the invention may be installed in a computer during manufacturing of the real vehicle. A purchaser of the vehicle may thus get the possibility to purchase the simulation device with a vehicle model stored therein, which vehicle model is developed at the same time as the vehicle. A purchaser of the vehicle may thus in a favourable way get access to a simulated model of the vehicle in a very early stadium, compared to if a "reverse engineering" first has to be provided in for creating a vehicle model of the vehicle purchased.

The invention thus provides a cost efficient solution to the above given problems.

Software comprising program code for vehicle simulation may easily be updated or changed. Further, different parts of the software comprising function models corresponding to different physical function elements, such as e.g. subsystems or components of the real vehicle may be replaced independent of each other. This modular configuration is advantageous from a maintenance perspective.

Further objective, advantages and new features of the present invention will appear for the skilled person from the following details, as well as via exercising of the invention. While the invention is disclosed below it should be apparent that the invention is not limited to the specific details described. Skilled persons having access to the teaching herein will recognize further applications, modifications and incorporations within other fields being within the scope of the invention.

DESCRIPTION OF THE DRAWINGS

For a more complete understanding of the present invention and further objects and advantages thereof, reference is now made to the following detailed description to be read in conjunction with the accompanying drawings, wherein like reference characters refer to like parts throughout the different views, and in which.

DETAILED DESCRIPTION OF THE FIGURES

Figure 1:
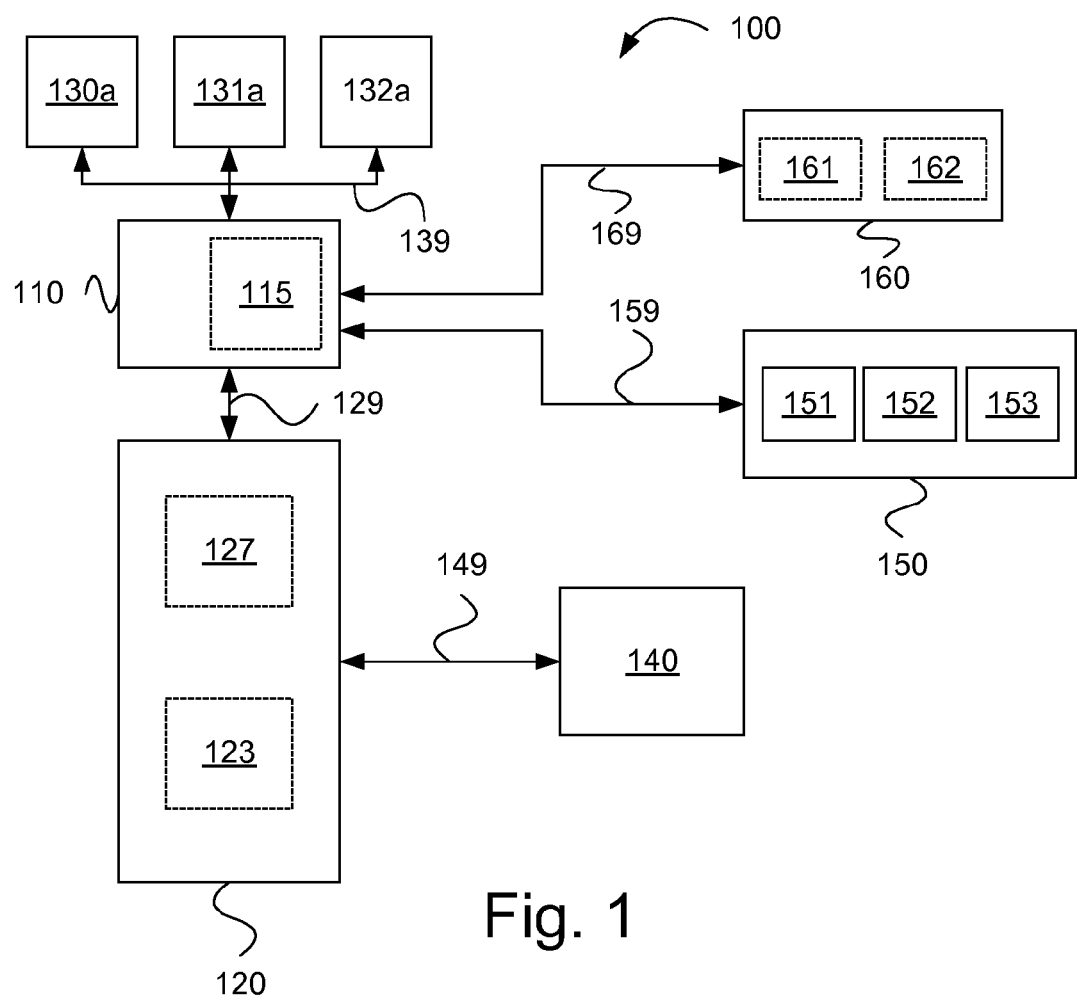
FIG. 1 schematically illustrates a training system comprising a simulation device according to an embodiment of the invention.

With reference to FIG. 1 a training system 100 is shown being suitable for education of different categories of personnel intended to work with a ground vehicle, such as a military vehicle. The vehicle may be a combat vehicle or a tank.

A first category of personnel may be carriage crew comprising a carriage chief intended to have the operative responsibility of the vehicle. The carriage crew may also comprise a marksman and a driver. A second category of personnel may be maintenance technicians with the task of maintaining the vehicle. A third category of personnel may be constructors of the vehicle, the tasks of which may comprise developing different systems of the vehicle.

Herein the term "link" is referred to as a communication link which may be a physical line, such as an opto-electronic communication line, or a non-physical line, such as a wireless connection, e.g. a radio link or microwave link.

The training equipment 100 comprises a first simulation unit 110. The first simulation unit 110 is described in more detail below with reference to FIGS. 2 and 3.

The first simulation unit 110 comprises a vehicle model 115. According to an embodiment the vehicle model 115 is a computer program being stored in a memory in the first simulation unit 110. The vehicle model 115 is also denominated as a model for a virtual vehicle. The vehicle model 115 comprises a number of function models each being associated with a corresponding function element representing a subsystem of the real vehicle being simulated by means of the vehicle model 115.

The first simulation unit 110 is arranged for communication with a second simulation unit 120 via a link 129. The second simulation unit 120 comprises an environment model 123 which according to an embodiment is constituted by software being stored in a memory in the second simulation unit 120. The second simulation unit 120 also comprises an actor model 127 which according to an embodiment is constituted by software being stored in a memory in the second simulation unit 120.

The environment model 123 is a simulation model indicating how a fictitious environment for the vehicle to be simulated looks like. The environment model 123 describes e.g. the landscape where the simulated vehicle acts. In this fictitious landscape altitude contours, type of terrain, properties of the ground and infrastructure, such as e.g. roads and buildings are defined. The environment model 123 comprises information about the external environment for the vehicle to be simulated, with which information the training system 100 may provide a simulation environment being as realistic as possible.

The actor model 127 is a simulation model defining a number of fictitious units intended to act in the environment model 123. The actor model 127 is arranged to handle these units within the frame of a simulated scenario desired to be provided with the training equipment 100. The actor model 127 may comprise an arbitrary number of fictitious units. The fictitious units may be of an arbitrary kind. The fictitious units may according to an embodiment represent military vehicles, such as e.g. tanks, combat vehicles, anti-aircraft gun vehicles, armoured cross-country vehicles, tracked vehicles or an arbitrary combination of these.

The actor model 127 is arranged to control drive and effect of the fictitious units for providing a desired and realistic simulation scenario.

An instructor unit 140 is arranged for communication with the second simulations unit 120 via a link 149. The instructor unit 140 may comprise a PC, computer mouse and keyboard, or other suitable unit facilitating for an instructor to command, supervise, influence and afterwards evaluate a simulation scenario of the training equipment 100. An instructor may thereby in advance build up a scenario to be simulated, such as e.g. a combat exercise. The instructor may also influence the environment model 123 and/or actor model 127. According to an example the instructor may add or remove one or more units in the actor model 127. In a similar way the instructor may add, remove or modify altitude contour, type of terrain, properties of the ground and infrastructure, such as e.g. roads and buildings. The instructor may also instruct personnel being trained by means of the training equipment 100 prior to or during a simulation by sending commands, such as e.g. order or requests, via the second simulation unit 120.

The first simulation device 110 is arranged for communication with a number of engageable physical function elements. According to the embodiment being illustrated in FIG. 1 three engageable function elements 130a, 131a and 132a are provided.

The engageable function elements may be connected to the first simulation device 110 via a respective link 139.

The engageable function elements may be function elements being of the same kind as the ones existing in the real vehicle. Theses function elements may be provided by manufactures of the real vehicle, or a subcontractor thereto. Alternatively the function elements may be a copy of the function elements being installed in the real vehicle. According to an alternative the engageable function elements may be hardware modules providing a desired functionality and which may be a part of the training equipment 100 due to financial reasons. According to an example a function element in the form of a steering wheel may be replaced by a considerably cheaper control column, e.g. in the form of a joy-stick. According to another example a function element in the form of a load unit for ammunition may be replaced with a press button for providing the functionality to load a fire tube of the fictitious vehicle being part of the simulation.

According to the embodiment illustrated the first function element 130a is an actuator for controlling the fictitious vehicle. These actuators 130a may e.g. be constituted by a steering wheel or control column.

The second function element 131*a* is hereby exemplified as a telemeter for measuring ranges to e.g. a unit being part of the simulation relative to the fictitious vehicle.

The third function element 132*a* is hereby exemplified as a unit comprising a gas trigger, e.g. in the form of an accelerator pedal, a clutch pedal and a brake pedal.

It should be noted that an arbitrary number of function elements may be connected to the first simulation unit 110. The function elements are detachably connected to the first simulation unit 110 via a respective link 139. The function elements being connected to the first simulation unit 110 are preferably subsystems having a corresponding subsystem in the real vehicle to be simulated by means of the vehicle model 115.

The first simulation unit 110 is arranged for communication with a first user terminal 150 via a link 159. The first user terminal 150 is according to this embodiment arranged with three display units, namely a first display screen 151, a second display screen 152 and a third display screen 153. At the first user terminal 150 at least one user of the training equipment 100 participating in a simulation comprising the fictitious vehicle is present. The first display screen 151 is arranged to display a driver panel (instrument panel) of the simulated vehicle, such as e.g. from a periscope, direction means or windows. The second display screen 152 is arranged to display e.g. block diagrams for different subsystems of the fictitious vehicle. The third display screen 153 is arranged to display diagnostic tools for facilitating surveillance of how the fictitious vehicle behaves during simulation.

The first user terminal 150 is suitable for use by e.g. developers of vehicles and maintenance personnel for the real vehicle.

The first simulation unit 110 is also arranged for communication with a second user terminal 160 via a link 169. The second user terminal 160 is according to this embodiment arranged with two display units, namely a first display screen 161 and a second display screen 162. At the second user terminal 160 at least one user of the training equipment 100 participating in a simulation comprising the fictitious vehicle is present. In practise also the physical function elements being engaged to the first simulation unit 110 may be present at the second user terminal 160.

The first display screen 161 is arranged to display one or more views from the simulated vehicle, such as e.g. from one or more periscopes, direction means or windows. The second display screen 162 is arranged to display one driver panel (instrument panel) and/or graphical representations for different subsystems of the fictitious vehicle.

The second user terminal 160 is suitable for use of personnel to be trained for driving the real vehicle by means of the training equipment 100. According to an example a driver, marksman and/or carriage chief may be trained by participating in exercises being simulated by means of the training system 100.

The first user terminal 150 and the second user terminal 160 comprises the equipment being required for facilitating participation in exercises by means of the training equipment 100, such as e.g. keyboard, computer mouse etc. The display screens being at the first and second user units may be touch screens. It should be noted that the physical function element being engaged to the first simulation unit 110 may be present at the first user terminal 150 for use of a relevant category of personnel.

Even if the first simulation device 110 and the second simulation device 120 are described as two separate units they may according to a configuration be integrated as one single simulation device comprising the vehicle model, the environment model and the actor model.

According to an embodiment the training system 100 comprises a first simulation device 110 comprising the vehicle model 115, a second simulation device comprising the environment model 123 and a third simulation device comprising the actor model 127.

A skilled person realises that many different simulation scenarios and exercises may be performed by means of the training equipment 100. It should also be noted that the training equipment 100 may be configured in an arbitrary way on the basis of which simulation scenarios and exercises are to be performed. E.g. a number of different user terminals may be provided in the case where several vehicle simulations wish to be run. The first simulation unit 110 may thereby comprise a number of vehicle models for the real vehicle to be simulated. A unique user terminal may be provided for each real vehicle to be simulated with a corresponding vehicle model 115. Thereby a unique set of physical function elements may be engaged to the first simulation unit 110 and placed at intended user terminal.

According to an embodiment the training system 100 may comprise a number of first simulations devices 110 with a unique vehicle model 115 stored therein, wherein a unique set of physical function elements are engaged to each first simulation device and placed at a respective user terminal. The environment model 123 and actor model 127 may be adapted in a suitable way in the case where several fictitious vehicle representing corresponding real vehicles are to be simulated at the same time.

Figure 2:
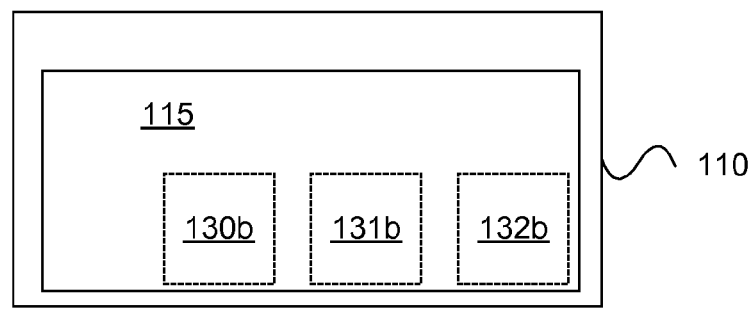
FIG. 2 schematically illustrates the simulation device shown in FIG. 1, according to an embodiment of the invention.
Figure 3:
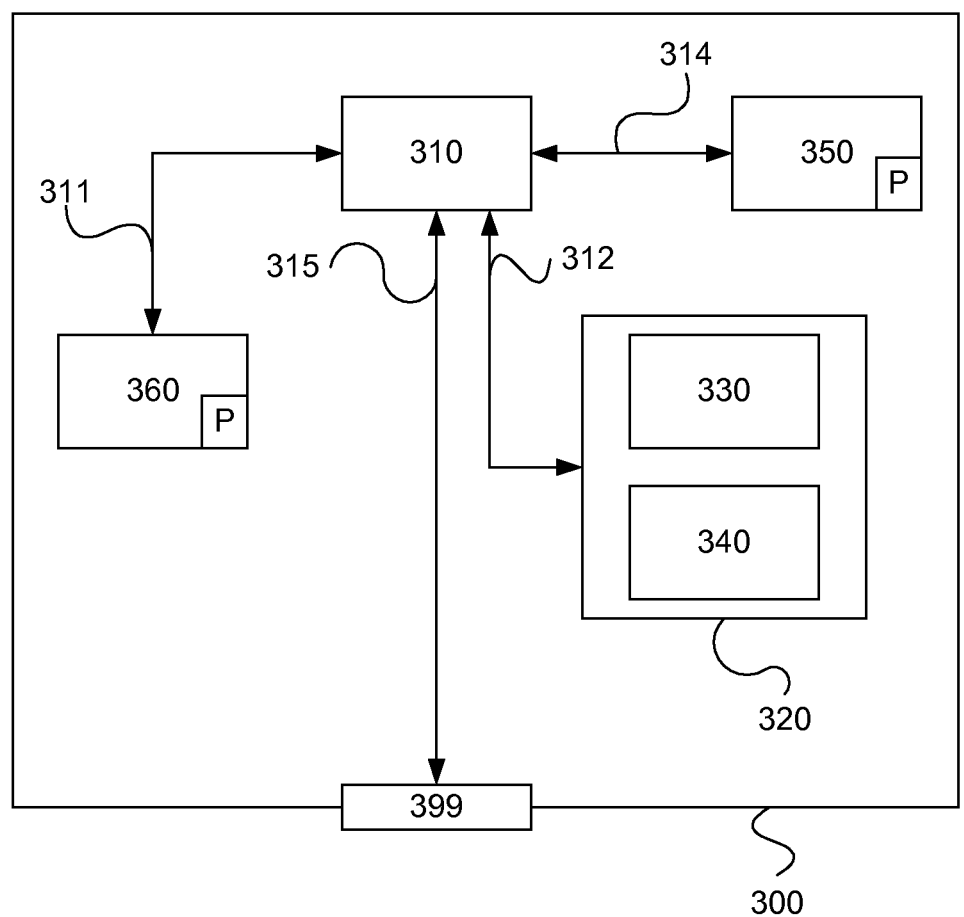
FIG. 3 schematically illustrates a computer according to an embodiment of the invention.

With reference to FIG. 2 the first simulation device 110 which also is described with reference to FIG. 1 and FIG. 3 is shown. The simulation device 110 comprises hardware and software as described in further detail with reference to FIG. 3 below.

The simulation device 110 comprises software in the form of the vehicle model 115 being stored in a memory of the simulation device 110. The vehicle model 115 comprises a predetermined number of function models concerning a corresponding determined function element. Each function model is arranged and intended to be deactivated at engagement of corresponding physical function elements to the first simulation unit 110. Further the deactivated function model is arranged and intended to be reactivated at disengagement of said engaged function element.

This facilitates engaging an arbitrary physical function element to the first simulation unit 110 and using this instead of a corresponding function model of the vehicle model 115 during a simulation scenario.

According to an embodiment a function model is provided for each function element of the real vehicle. Some examples on function elements may be engine, gearbox, individual wheels of the vehicle, tracks of the vehicle, individual components and actuators, subsystems such as e.g. fuel injection systems, weapons systems, etc. Every function element of the real vehicle may be modelled in the form of a corresponding function model of the vehicle model 115 of the simulation model 110.

According to an embodiment the physical function elements wished to be trained are foremost engaged by means of imposition of hands of the personnel intended to utilize the training equipment 100. Examples of such function elements may be e.g. gas trigger or equipment for telemetry.

According to the embodiment described in more detail in FIG. 1 above the first function element 130*a* is an actuator for controlling the fictitious vehicle. These actuators 130*a* may e.g. be constituted by a steering wheel or a control column.

The first function element 130a is corresponded by a first function model 130b of the vehicle model 115.

The second function element 131a is exemplified as a telemeter for measuring ranges to e.g. a unit being part of the simulation relative to the fictitious vehicle. The telemeter 131a is hereby arranged in a suitable way for generating a range to a fictitious vehicle generated by the actor model 127 which fictitious vehicle may be seen by practising personnel on the first display screen 161 of the second user terminal 160. The second function element 131a is corresponded by a second function model 131b of the vehicle model 115.

The third function element 132a is exemplified as a unit comprising a gas trigger, e.g. in the form of an accelerator pedal, clutch pedal and a brake pedal. The third function element 132a is corresponded by a function model 132b of the vehicle model 115.

In the case where a physical function unit is engaged to the first simulation unit 110 the corresponding function model of the vehicle model may be deactivated. Thereby a user of the training equipment may use the physical function model of e.g. the second user terminal 160 while the corresponding function model is deactivated.

In the case where a physical function unit is disengaged from the first simulation unit 110 the corresponding function model of the vehicle model may be reactivated. Thereby a user of the training equipment may use the function model of the vehicle model in the simulation while the physical function model of e.g. the second user terminal 160 is disengaged.

With reference to FIG. 3 a diagram of a method of an apparatus 300 is shown. The first simulation device 110 being described with reference to FIG. 1 and FIG. 2 may in an embodiment comprise the apparatus 300. The second simulation device 120 being described with reference to FIG. 1 may in an embodiment comprise the device 300. Further the instructor terminal 140, the first user terminal 150 and the second user terminal 160 may each comprise an apparatus 300.

Apparatus 300 comprises a non-volatile memory 320, a data processing unit 310 and a read/write memory 350. Non-volatile memory 320 has a first memory portion 330 wherein a computer program, such as an operating system, is stored for controlling the function of apparatus 300. Further, apparatus 300 comprises a bus controller, a serial communication port, I/O-means, an A/D-converter, a time date entry and transmission unit, an event counter and an interrupt controller (not shown). Non-volatile memory 320 also has a second memory portion 340.

A computer program P is provided, comprising routines for facilitating deactivation of a function model concerning a determined function element at engagement of corresponding physical function elements to the first simulation unit 110 according to an aspect of the invention. The program P comprises routines for facilitating reactivation of the deactivated function model at disengagement of said engaged function element, according to an aspect of the invention. The program may be stored in an executable manner or in a compressed state in a separate memory 360 and/or in read/write memory 350.

When it is described that data processing unit 310 performs a certain function it should be understood that data processing unit 310 performs a certain part of the program which is stored in separate memory 360, or a certain part of the program which is stored in read/write memory 350.

Data processing unit 310 may communicate with a data port 399 by means of a data bus 315. Non-volatile memory 320 is adapted for communication with data processing unit 310 via a data bus 312. Separate memory 360 is adapted to communicate with data processing unit 310 via a data bus 311. Read/write memory 350 is adapted to communicate with data processing device 310 via a data bus 314. To the data port 399 e.g. the links 129, 139, 149, 159 and 169 may be connected (see FIG. 1).

When data is received on data port 399 it is temporarily stored in second memory portion 340. When the received input data has been temporarily stored, data processing unit 310 is set up to perform execution of code in a manner described above. According to one embodiment, data received on data port 399 comprises control information generated by a physical function element. According to an embodiment signals received on the data port 399 comprises information about angle of steering wheel or position of gas trigger of a function element being engaged to the first simulation unit 110. According to another example signals received on the data port 399 comprises information sent from the second simulation device 120, such as e.g. information generated by the environment model 123 and/or actor model 127. According to another example signals received on the data port 399 comprises information sent from the instructor unit 140, via the second simulation device 120, such as e.g. information intended for one or several users present at the first user device 150 or the second user device 160.

Activation and/or deactivation and/or reactivation of an arbitrary function model in the vehicle model 115 may occur automatically at engagement and disengagement respectively of a corresponding physical function element.

Activation and/or deactivation and/or reactivation of an arbitrary function model in the vehicle model 115 may be initiated manually at engagement and disengagement respectively of a corresponding physical function element of e.g. an instructor using the instructor terminal 140.

Hereby an operator may, by means of e.g. a computer mouse, mark on a computer screen if a physical function element shall be simulated by means of a corresponding function model or if the engaged physical function element shall be arranged to integrated with simulation device.

Activation and/or deactivation and/or reactivation of an arbitrary function model in the vehicle model 115 may be initiated manually at engagement and disengagement respectively of a corresponding physical function element of e.g. a user using the first user terminal 150 or the second user terminal 160.

Activation and/or deactivation and/or reactivation of an arbitrary function model in the vehicle model 115 may be initiated manually at engagement and disengagement respectively of a corresponding physical function element of e.g. an operator of the training equipment 100 using the first simulation device 110.

Activation and/or deactivation and/or reactivation of an arbitrary function model in the vehicle model 115 may be initiated automatically at engagement and disengagement respectively of a corresponding physical function element. There is thus provided a possibility to sense and signal that a determined function element is engaged to the simulation equipment according to the invention. This may according to an example occur through so called strappings in the connector, by means of which function elements are engaged. An electric circuit is closed, which may be sensed and signalled and effectuate deactivation. This may according to another example occur through continuous contact with and sensing by means of a data bus of a network for signalling an engagement of a function element with subsequent deactivation. Disengagement of a determined function element is performed in a corresponding way providing reactivation.

Parts of the methods described herein may be performed by the apparatus 300 with the help of data processing unit 310 running the program stored in memory 360 or read/write memory 350. When the apparatus 300 runs the program methods described herein are executed, i.e. deactivation and/or reactivation of an arbitrary function model in the vehicle model 115 may be provided at engagement and disengagement respectively of a corresponding physical function element.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A simulation device concerning a ground vehicle, the simulation device comprising:
   a vehicle model comprising a predetermined number of function models configured to simulate corresponding physical function elements of said vehicle;
   arrangements configured to store said vehicle model and enable simulation of said vehicle; and
   arrangements configured to engage physical function elements to the simulation device,
   wherein said vehicle model is developed during development and/or manufacturing of the vehicle,
   wherein said function models are based on real characteristics of the physical function elements of the vehicle determined during development and/or manufacturing of said vehicle, and
   wherein a function model configured to simulate a corresponding physical function element is configured to be deactivated at engagement of said corresponding physical function element to the simulation device and reactivated at disengagement of said corresponding physical function element from the simulation device.

2. A simulation device according to claim 1, wherein said vehicle characteristics represents real sets of values of said characteristics including parameters.

3. A simulation device according to claim 1, wherein each of said function elements is selected from a group consisting of engine, gearbox, control system and weapons system elements.

4. A computer program for a simulation device for training equipment for a real ground vehicle, the simulation device comprising:
   a vehicle model including a predetermined number of function models configured to simulate corresponding function elements of said vehicle and arrangements configured to engage physical function elements to the simulation device,
   said computer program comprising program code stored on a computer-readable storage medium for causing the simulation device to perform the steps of:
      deactivating a function model configured to simulate a corresponding physical function element at engagement of the corresponding physical function element to the simulation device, and
      reactivating the deactivated function model at disengagement of said corresponding physical function element, wherein said vehicle model is developed during development and/or manufacturing of the vehicle, and wherein said function model is based on real characteristics of the physical function elements of the vehicle determined during development and/or manufacturing of said vehicle.

5. A computer program according to claim 4, wherein said vehicle characteristics renders real sets of values of said vehicle characteristics including parameters.

6. A computer program according to claim 4, wherein said function element is selected from a group consisting of engine, gearbox, control system and weapons system elements.

7. A computer program product comprising a computer program stored on a computer-readable storage medium for performing, in a simulation device for training equipment for a real ground vehicle, the simulation device comprising a vehicle model including a predetermined number of function models for simulation of corresponding function elements of said vehicle and arrangements configured to engage physical function elements to the simulation device, the steps of:
   deactivating a function model configured to simulate a corresponding physical function element at engagement of the corresponding physical function element to the simulation device, and
   reactivating the deactivated function model at disengagement of said corresponding physical function element, when said computer program is run on the simulation device, wherein said vehicle model is developed during development and/or manufacturing of the vehicle, and wherein said function model is based on real characteristics of the physical function elements of the vehicle determined during development and/or manufacturing of said vehicle.

8. A computer program product according to claim 7, wherein said vehicle characteristics renders real sets of values of said vehicle characteristics including parameters.

9. A computer program product according to claim 7, wherein said function element selected from a group comprising engine, gearbox, control system and weapons system.

* * * * *